United States Patent
Fan et al.

(10) Patent No.: US 9,940,532 B2
(45) Date of Patent: Apr. 10, 2018

(54) LIVENESS DETECTION APPARATUS AND LIVENESS DETECTION METHOD

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Haoqiang Fan, Beijing (CN); Kai Jia, Beijing (CN); Qi Yin, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/983,096

(22) Filed: Dec. 29, 2015

(65) Prior Publication Data

US 2017/0053174 A1 Feb. 23, 2017

(30) Foreign Application Priority Data

Aug. 18, 2015 (CN) .......................... 2015 1 0508262

(51) Int. Cl.
*G06K 9/00* (2006.01)
(52) U.S. Cl.
CPC ..... *G06K 9/00906* (2013.01); *G06K 9/00221* (2013.01); *G06K 9/00899* (2013.01)
(58) Field of Classification Search
CPC combination set(s) only.
See application file for complete search history.

(56) References Cited

U.S. PATENT DOCUMENTS

| 8,856,541 | B1 * | 10/2014 | Chaudhury | ............. G06F 21/32 |
| | | | | 382/115 |
| 2007/0268485 | A1 * | 11/2007 | Polonskiy | ............ A61B 5/0059 |
| | | | | 356/300 |

FOREIGN PATENT DOCUMENTS

| CN | 102789572 | 11/2012 |
| CN | 103077382 | 5/2013 |
| CN | 103106397 | 5/2013 |

(Continued)

OTHER PUBLICATIONS

Chinese Office Action, issued in the corresponding Chinese patent application No. 201510508262.3, dated Aug. 2, 2016, 8 pages.

(Continued)

*Primary Examiner* — Alex Liew
(74) *Attorney, Agent, or Firm* — Hamre, Schumann, Mueller & Larson, P.C.

(57) ABSTRACT

A liveness detection apparatus and a liveness detection method are provided. The liveness detection apparatus may comprise: a specific exhibiting device, for exhibiting a specific identification content; an image acquiring device, for acquiring image data of a target object to be recognized during the exhibition of the identification content; a processor, for determining whether there is a reflective region corresponding to the identification content in the acquired image data, determining a regional feature of the reflective region when there is the reflective region, to obtain a determination result, and recognizing whether the target object is a living body based on the determination result.

16 Claims, 7 Drawing Sheets

(56) References Cited

FOREIGN PATENT DOCUMENTS

CN    104794453    7/2015
WO    2015040001   3/2015

OTHER PUBLICATIONS

Second Chinese Office Action, issued in the corresponding Chinese patent application No. 201510508262.3, dated Feb. 4, 2017, 7 pages.
Third Chinese Office Action, issued in the corresponding Chinese patent application No. 201510508262.3, dated Jun. 28, 2017, 10 pages.

* cited by examiner

LIVENESS DETECTION APPARATUS AND LIVENESS DETECTION METHOD

The present disclosure claims priority of Chinese Patent Application No. 201510508262.3 filed on Aug. 18, 2015, and the full texts of the above Chinese patent application are incorporated by reference herein as part of the present disclosure.

TECHNICAL FIELD

The present disclosure relates to a technical field of face recognition, and more particularly, to a liveness detection apparatus and a liveness detection method.

BACKGROUND

Face recognition is a biological recognition technology which performs identity recognition based on human facial feature information. Upon face recognition, a face image of an object to be recognized can be obtained by using a camera in a non-contact mode, and then the obtained image is compared with images stored in a database so as to complete a recognition process. Currently, the face recognition technology has been used in fields such as banking, social welfare and security, e-commerce, and security and defense, etc. For example, a face recognition system may be applied to a remote bank account opening system, an access control system, remote trading and operation verification system, and so on.

In application of identity recognition based on face recognition, some malicious and deceptive face-based identity verification methods are derived. For example, an attacker uses a false face, or plays video, animation, and so on, to counterfeit a facial action of a specific person, so as to deceive face-based identity verification. This may make the face-based identity verification method susceptible to these attacks. In order to improve accuracy of identity recognition, firstly, an object to be verified may be verified to be a living body, then facial features of the object to be verified are compared with facial features of respective users already stored in the database to recognize the identity of the object to be verified. Therefore, it is expected to provide a technical solution effectively used for liveness detection, so as to effectively prevent attacks by means of non-living tools.

SUMMARY

Embodiments of the present disclosure provide a liveness detection apparatus and a liveness detection method, which can recognize a specific target object which does not have a human face of a living body, so as to effectively prevent attacks from an attacker who uses an image, a video display and other non-living tools.

In a first aspect, a liveness detection apparatus is provided. The liveness detection apparatus may comprise: a specific exhibiting device, for exhibiting a specific identification content; an image acquiring device, for acquiring image data of a target object to be recognized during the exhibition of the identification content; a processor, for determining whether there is a reflective region corresponding to the identification content in the acquired image data, determining a regional feature of the reflective region when there is the reflective region, to obtain a determination result, and recognizing whether the target object is a living body based on the determination result.

In combination with the first aspect, in an implementation mode of the first aspect, the specific exhibiting device may be used for exhibiting at least one of a title bar, a tool bar and a background region of the liveness detection apparatus as the identification content.

In combination with the first aspect and the above-described implementation mode, in another implementation mode of the first aspect, the specific exhibiting device may include: a sequence generator, for randomly generating a reference sequence; and a display, for applying the reference sequence to the identification content, to adjust a display effect of the identification content.

In combination with the first aspect and the above-described implementation modes, in another implementation mode of the first aspect, the display may be used for applying the reference sequence to an application pattern having an animation effect, to adjust a display effect of the application pattern.

In combination with the first aspect and the above-described implementation modes, in another implementation mode in the first aspect, the processor may determine whether there is the reflective region in the acquired image data by operations of: calculating a correlation coefficient between respective pixel values in the acquired image data and the reference sequence; determining whether positions where the respective pixels are located are reflective positions based on the correlation coefficient; and determining whether there is the reflective region based on the calculated reflective positions.

In combination with the first aspect and the above-described implementation modes, in another implementation mode of the first aspect, the reference sequence may be a reference luminance sequence which includes a plurality of reference luminance values different from each other, the display applies the plurality of reference luminance values sequentially to the identification content at different time points, and the processor may calculate the correlation coefficient by operations of: obtaining pixel values of each pixel in the acquired image data at the respective time points when the reference luminance values are applied; calculating a mean value and a variance of the pixel values at the respective time points; calculating a mean value and a variance of the reference luminance sequence; calculating the correlation coefficient between the pixel values and the reference sequence based on the mean value and the variance of the pixel values and the mean value and the variance of the reference luminance sequence.

In combination with the first aspect and the above-described implementation modes, in another implementation mode of the first aspect, the identification content may include a predetermined identification pattern, and the processor may obtain the determination result by operations of: determining whether there is a region corresponding to the exhibited identification pattern in the acquired image data; and taking the region corresponding to the exhibited identification pattern as the reflective region if there is the region corresponding to the exhibited identification pattern.

In combination with the first aspect and the above-described implementation modes, in another implementation mode of the first aspect, the processor may calculate at least one of a size and a position of the reflective region as the regional feature of the reflective region, and recognize whether the target object is a living body based on at least one of the size and the position of the reflective region.

In combination with the first aspect and the above-described implementation modes, in another implementation mode of the first aspect, in the case of recognizing whether the target object is a living body based on the size of the reflective region, the processor may compare the size of the reflective region with a first threshold and a second threshold, wherein the second threshold is greater than the first threshold, and recognize the target object not as a living body when the size of the reflective region is greater than or equal to the first threshold and less than the second threshold, or otherwise, recognize the target object as a living body; and in the case of recognizing whether the target object is a living body based on the position of the reflective region, the processor may determine the position of the reflective region in the acquired image data, and recognize the target object not as a living when the position of the reflective region is adjacent to an edge of the acquired image data, or otherwise, recognize the target object as a living body.

In combination with the first aspect and the above-described implementation modes, in another implementation mode of the first aspect, the liveness detection apparatus may be provided in a hand-held terminal, and the image acquiring device may be a front camera of the hand-held terminal.

In a second aspect, a liveness detection method is provided. The liveness detection method comprises: exhibiting a specific identification content for a target object to be recognized; acquiring image data of the target object during the exhibition of the identification content; determining whether there is a reflective region corresponding to the identification content in the acquired image data, and determining a regional feature of the reflective region when there is the reflective region is detected, to obtain a determination result; and recognizing whether the target object is a living body based on the determination result.

In combination with the second aspect, in an implementation mode of the second aspect, the liveness detection method may be used in a liveness detection apparatus, and the step of exhibiting a specific identification content for a target object to be recognized may include: exhibiting at least one of a title bar, a tool bar and a background region of the liveness detection apparatus as the identification content.

In combination with the second aspect and the above-described implementation mode, in another implementation mode of the second aspect, the step of exhibiting a specific identification content for a target object to be recognized may include: randomly generating a reference sequence; and applying the reference sequence to the identification content, to adjust a display effect of the identification content.

In combination with the second aspect and the above-described implementation modes, in another implementation mode of the second aspect, the step of applying the reference sequence to the identification content, to adjust a display effect of the identification content may include: applying the reference sequence to an application pattern having an animation effect, to adjust a display effect of the application pattern.

In combination with the second aspect and the above-described implementation modes, in another implementation mode of the second aspect, the step of determining whether there is a reflective region corresponding to the identification content in the acquired image data may include: calculating a correlation coefficient between respective pixel values in the acquired image data and the reference sequence; determining whether positions where respective pixels are located are reflective positions based on the correlation coefficient; determining whether there is the reflective region based on the calculated reflective positions.

In combination with the second aspect and the above-described implementation modes, in another implementation mode of the second aspect, the reference sequence may be a reference luminance sequence which includes a plurality of reference luminance values different from each other; the step of applying the reference sequence to the identification content, to adjust a display effect of the identification content includes: applying the plurality of reference luminance values sequentially to the identification content at different time points, to adjust the display effect of the identification content; the step of calculating a correlation coefficient between respective pixel values in the acquired image data and the reference sequence includes: obtaining pixel values of each pixel in the acquired image data at the respective time points when the reference luminance values are applied; calculating a mean value and a variance of the pixel values at the respective time points; calculating a mean value and a variance of the reference luminance sequence; calculating the correlation coefficient between the pixel values and the reference sequence based on the mean value and the variance of the pixel values and the mean value and the variance of the reference luminance sequence.

In combination with the second aspect and the above-described implementation modes, in another implementation mode of the second aspect, the identification content may include a predetermined identification pattern, and the step of determining whether there is a reflective region corresponding to the identification content in the acquired image data may include: determining whether there is a region corresponding to the exhibited identification pattern in the acquired image data; and taking the region corresponding to the exhibited identification pattern as the reflective region if the region corresponding to the exhibited identification pattern is detected.

In combination with the second aspect and the above-described implementation modes, in another implementation mode of the second aspect, the step of determining a regional feature of the reflective region may include: calculating at least one of a size and a position of the reflective region as the regional feature; and the step of recognizing whether the target object is a living body based on the determination result may include: recognizing whether the target object is a living body based on at least one of the size and the position of the reflective region.

In combination with the second aspect and the above-described implementation modes, in another implementation mode of the second aspect, the step of recognizing whether the target object is a living body based on at least one of the size and the position of the reflective region may include: in the case of recognizing whether the target object is a living body based on the size of the reflective region, comparing the size of the reflective region with a first threshold and a second threshold, wherein the second threshold is greater than the first threshold, and recognizing the target object not as a living when the size of the reflective region is greater than or equal to the first threshold and less than the second threshold, or otherwise, recognizing the target object as a living body; in the case of recognizing whether the target object is a living body based on the position of the reflective region, determining the position of the reflective region in the acquired image data, and recognizing the target object not as a living body when the position of the reflective region is adjacent to an edge of the acquired image data, or otherwise, recognizing the target object as a living body.

In combination with the second aspect and the above-described implementation modes, in another implementation mode of the second aspect, the liveness detection method may be applied to a hand-held terminal, and the step of acquiring image data of the target object includes: acquiring the image data of the target object by using a front camera of the hand-held terminal.

In a third aspect, there is provided an electronic apparatus, comprising the liveness detection apparatus as described above.

In the technical solutions of the liveness detection apparatus and the liveness detection method according to the embodiments of the present disclosure, by means of detecting the reflective region corresponding to the identification content in the acquired image data of the target object, and determining the regional feature of the reflective region, a specific target object which does not have a living human face of a living can be recognized, so as to effectively prevent attacks from an attacker using an image, video display and other non-living tools.

BRIEF DESCRIPTION OF THE DRAWINGS

In order to clearly illustrate the technical solutions of the embodiments of the present disclosure, a brief introduction of the drawings required for description of the embodiments shall be given hereinafter; and apparently, the drawings described as follows are only some embodiments of the present disclosure, and for those of ordinary skill in the art, other drawings can also be obtained according to these drawings.

DETAILED DESCRIPTION

Hereinafter, the technical solutions of the embodiments of the disclosure will be described in a clearly and fully understandable way in connection with the drawings in the embodiments of the present disclosure. It is obvious that the described embodiments are just a part but not all of the embodiments of the present disclosure, in a case of no conflict, the embodiments of the present application and the features of the embodiments may be arbitrarily combined with each other.

Figure 1:
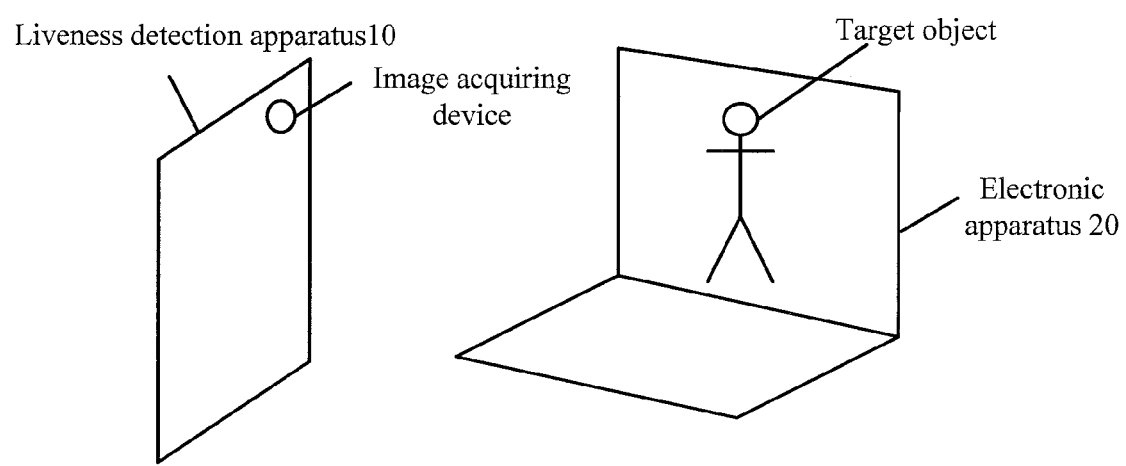
FIG. 1 schematically illustrates a scenario framework of liveness detection according to an embodiment of the present disclosure.

FIG. 1 schematically illustrates a scenario framework of liveness detection according to an embodiment of the present disclosure. As shown in FIG. 1, a target object to be verified faces a liveness detection apparatus 10. The liveness detection apparatus 10 is provided with an image acquiring device. The image acquiring device can acquire an image of the target object to be verified. An attacker may exhibit an image or a video of the target object by using an electronic apparatus 20. The electronic apparatus 20 is, for example, a notebook computer, a tablet computer, E-paper, or photographic paper having an image of the target object. By using the electronic apparatus 20, the attacker may display any desired display content, so that a conventional living detecting solution based on user interaction and regular physiological signals fails.

In one embodiment, the liveness detection apparatus 10 in FIG. 1 may be a dedicated apparatus for liveness detection. In another embodiment, the liveness detection apparatus 10 may be a hand-held terminal having a living detecting function. The hand-held terminal can include, but not limited to, a mobile phone, a tablet computer, and so on. In another embodiment, the liveness detection apparatus 10 may also be any other electronic apparatus.

When an attacker exhibits a video or an image via the electronic apparatus 20 to initiate an attack, exhibition content of the liveness detection apparatus 10 usually produces a reflection phenomenon on the electronic apparatus 20 it faces, so as to produce a reflective region corresponding to the exhibition content of the liveness detection apparatus 10 on the electronic apparatus 20. When the target object is a normal person to be verified, the exhibition content of the liveness detection apparatus 10 cannot be reflected by means of a body part such as a face of the person to be verified, so that the reflective region cannot be produced; and even if the reflective region is produced, a regional feature of the reflective region is also obviously different from the regional feature of the reflective region produced by the exhibition content of the liveness detection apparatus 10 on the electronic apparatus 20.

In one embodiment of the present disclosure, the liveness detection apparatus 10 acquires the image for the target object, detects the reflective region corresponding to the exhibition content of the liveness detection apparatus 10 in the acquired image data of the target object, and determines the regional feature of the reflective region, and thus, attacks performed by an attacker by means of an image, video display and other non-living tools can be recognized, which improves security of a face recognition system.

Figure 2:
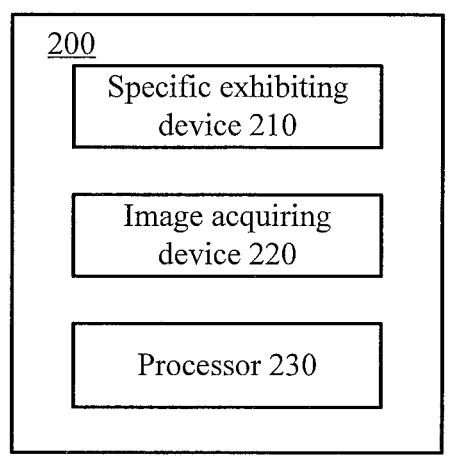
FIG. 2 schematically illustrates a block diagram of a liveness detection apparatus according to an embodiment of the present disclosure.

FIG. 2 schematically illustrates a block diagram of a liveness detection apparatus 200 according to an embodiment of the present disclosure. The liveness detection apparatus 200 corresponds to the liveness detection apparatus 10 shown in FIG. 1. As shown in FIG. 2, the liveness detection apparatus 200 comprises: a specific exhibiting device 210, for exhibiting a specific identification content; an image acquiring device 220, for acquiring image data of a target object to be recognized during the exhibition of the identification content; a processor 230, for determining whether there is a reflective region corresponding to the identification content in the acquired image data, determining a regional feature of the reflective region when there is the reflective region, to obtain a determination result, and recognizing whether the target object is a living body based on the determination result.

The specific exhibiting device 210 is used for exhibiting the specific identification content. The specific exhibiting device 210 may be implemented with a display, an image exhibition bar, and so on. The identification content is used for helping discriminate whether the liveness detection apparatus 200 produces reflection through the target object to be verified. When the target object is a video exhibited on an electronic apparatus by an attacker, any scene facing a screen of the electronic apparatus may produce reflection on the screen of the electronic apparatus, so that a picture of the scene appears on the screen of the electronic apparatus. In order to avoid influence of the scene in which the liveness detection apparatus 200 is located, the specific identification content is exhibited by the specific exhibiting device 210. The identification content faces the target object to be recognized, and reflection through the electronic apparatus of the attacker is most likely to appear, so as to form the reflective region corresponding to the identification content.

In one embodiment, the identification content may include any image content, for example, a picture content of a single color, an image content of an object, such as a big tree a desk, and so on. Any content that can be distinguished from the environment around the liveness detection apparatus can be taken as the identification content.

The identification content exhibited by the specific exhibiting device 210 is a content easily seen by the target object. When the attacker attacks by using the electronic apparatus, the attacker may easily find the existence of the identification content, and take a countermeasure. Thus, the specific exhibiting device 210 may exhibit the identification content in a hidden way. For example, the specific exhibiting device 210 may exhibit at least one of a title bar, a tool bar and a background region of the liveness detection apparatus 200 as the identification content. The liveness detection apparatus 200, when performing liveness detection, may display an interactive interface so as to interact with the target object. The title bar, the tool bar and the background region and so on of the interactive interface are inherent exhibition contents of the liveness detection apparatus 200, which thus can hardly be considered as the identification content specifically set for liveness detection.

Figure 3A:
FIG. 3(a) schematically illustrates a first example of an identification content exhibited by a specific exhibiting device in the liveness detection apparatus of FIG. 2.

FIG. 3(a) schematically illustrates a first example of the identification content exhibited by the specific exhibiting device 210 in the liveness detection apparatus of FIG. 2. As shown in FIG. 3(a), the specific exhibiting device 210 displays an inherent application "My Documents" in the liveness detection apparatus 200, and also displays a running hourglass at "My Documents". Uppermost in FIG. 3(a) is the title bar, next to the title bar is the tool bar, and lowermost in FIG. 3(a) is a taskbar. Any one or more of the title bar, the tool bar, the taskbar and the hourglass in FIG. 3(a) may be taken as the identification content.

Figure 3B:
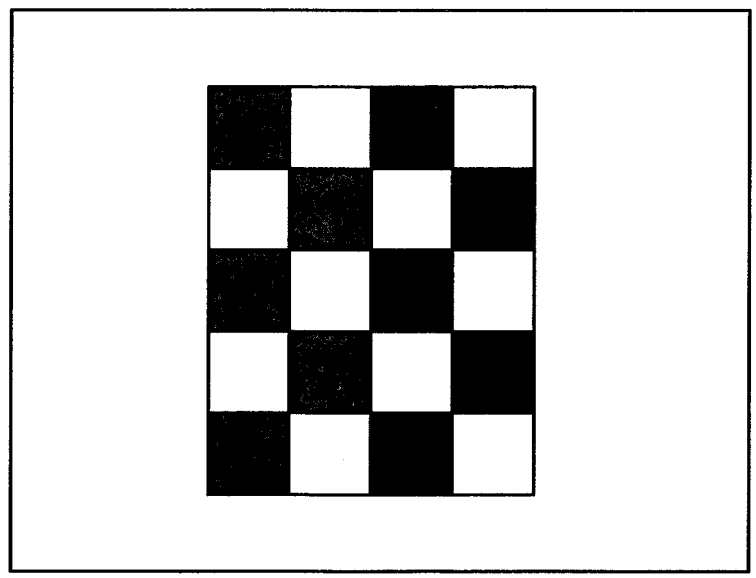
FIG. 3(b) schematically illustrates a second example of the identification content exhibited by the specific exhibiting device in the liveness detection apparatus of FIG. 2.

FIG. 3(b) schematically illustrates a second example of the identification content exhibited by the specific exhibiting device in the liveness detection apparatus of FIG. 2. FIG. 3(b) shows a black and white checkered pattern as the identification content. When verifying the target object, some other patterns or landscape pictures may be displayed so that a verification process is more interesting. Therefore, the specific exhibiting device 210 may exhibit these patterns, and take them as the identification contents.

Figure 4:
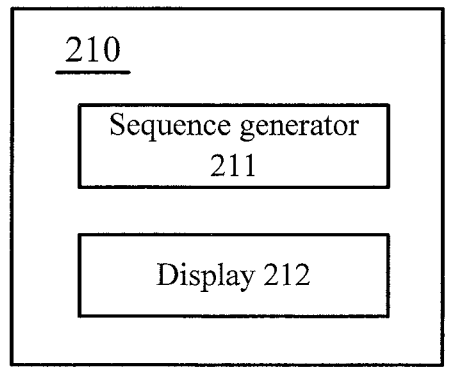
FIG. 4 schematically illustrates a structural block diagram of the specific exhibiting device in the liveness detection apparatus of FIG. 2.

FIG. 4 schematically illustrates a structural block diagram of the specific exhibiting device 210 in the liveness detection apparatus of FIG. 2. As shown in FIG. 4, the specific exhibiting device 210 may include: a sequence generator 211, for randomly generating a reference sequence; and a display 212, for applying the reference sequence to the identification content, to adjust a display effect of the identification content. The specific exhibiting device 210 in FIG. 4 can dynamically change the display effect of the identification content, so that the identification content can be recognized from the acquired image data of the target object more conveniently. The reference sequence generated by the sequence generator 211 includes, for example, a reference luminance sequence S[1 . . . n] which includes a plurality of reference luminance values different from each other, where n is a natural number greater than 1. The reference sequence is randomly generated by the sequence generator 211, which cannot be imitated in advance, so that attacks can be prevented. The display 212 may apply reference luminance values S[1] to S[n] to the identification content at different time points, respectively, so that luminance of the identification content changes with time. The reference sequence generated by the sequence generator 211 may also be a color parameter sequence C[1 . . . n], so that accordingly, color of the identification content changes with time. In order to avoid the attacker's attention, an application pattern having an animation effect may be used as the identification content, and the display 212 applies the reference sequence generated by the sequence generator 211 to the application pattern having the animation effect, to adjust a display effect of the application pattern.

The image acquiring device 220 in FIG. 2 acquires the image data of the target object to be recognized during the exhibition of the identification content. The image acquiring device 220 may be an ordinary visible-light-based color or gray-scale camera, for example, a network camera, a front camera of a mobile phone, and so on. The image acquiring device 220 performs an acquisition operation during the exhibition of the identification content, to ensure that the reflection of the identification content on the electronic apparatus of the attacker can be acquired, so as to determine the corresponding reflective region.

The processor 230 in FIG. 2 determines whether there is the reflective region corresponding to the identification content in the image data acquired by the image acquiring device 220, and determines a regional feature of the reflective region when there is the reflective region, to obtain a determination result. The reflective region is a projection of the identification content in a display screen used by the attacker. The processor 230 may detect the identification content in the image data acquired by the image acquiring device 220 to determine the reflective region.

The processor 230, for example, may obtain identification data of the identification content exhibited by the specific exhibiting device 210, and perform a similarity detection on the identification data and the image data acquired by the image acquiring device 220, to determine whether there is the reflective region corresponding to the identification content in the acquired image data. The processor 230 may determine the reflective region by using existing techniques or means or a variety of techniques or means that may appear in the future, and a specific mode for determining the reflective region does not constitute a limitation to the embodiment of the present disclosure.

When there is no reflective region corresponding to the identification content in the acquired image data, the processor 230 may determine that the target object is not a video or an image displayed on the electronic apparatus used by the attacker, so as to determine that the target object to be verified is a living body.

When there is the reflective region corresponding to the identification content in the acquired image data, the processor 230 further determines the regional feature of the reflective region. For example, the processor 230 may calculate at least one of a size and a position of the reflective region as the regional feature of the reflective region, and recognize whether the target object is a living body based on at least one of the size and the position of the reflective region.

The reflective region of the identification content produced in the acquired image through a living body such as a human face, is usually small, and relatively dispersed. When the attacker initiates an attack by using a display of the electronic apparatus, the size and the position of the reflective region of the identification content produced on the display of the electronic apparatus usually depend on the size of the identification content, and a distance and an included angle between the identification content and the target object, and for the size and the position of the reflective region, a typical size range and a typical position range can be obtained through an experiment. Thus, by means of one of the size and the position of the reflective region, it can be recognized whether the target object is a living body. Of course, it may further be recognized whether the target object is a living by means of both the size and the position of the reflective region, which may increase accuracy of recognition.

In the case of recognizing whether the target object is a living body based on the size of the reflective region, the processor 230 may compare the size of the reflective region with a first threshold and a second threshold, wherein the second threshold is greater than the first threshold, and recognize the target object not as a living body when the size of the reflective region is greater than or equal to the first threshold and less than the second threshold, or otherwise, recognize the target object as a living body. The first threshold and the second threshold are set based on above-described typical size range obtained through the experiment. A reflective property of a human body is far worse than a reflective property of the display of the electronic apparatus. When the size of the reflective region is less than the first threshold, the reflective region may be caused by reflection of the human body, and it can be determined that the target object is a living body. Depending on the size of the identification content and its positional relationship with respect to the target object, the size of the reflective region corresponding to the identification content is not likely to be too large. Accordingly, when the size of the reflective region is greater than or equal to the second threshold, the reflective region should not correspond to the identification content, and it can be determined that the target object is a living body.

The target object may wear glasses and so on. At this situation, the glasses may form a strong reflective property with respect to the identification content, so that the size of the reflective region is greater than or equal to the first threshold and less than the second threshold. Accordingly, if the target object is recognized not as a living body, it may be a false determination. Thus, in practice, other modes can be combined to recognize whether the target object is a living body. For example, the target object can be recognized as a living body or not based on the position of the reflective region.

In the case of recognizing whether the target object is a living body based on the position of the reflective region, the processor determines the position of the reflective region in the acquired image data, and recognizes the target object not as a living body when the position of the reflective region is adjacent to an edge of the acquired image data. The target object to be recognized is usually located at a center of the image acquired by the image acquiring device 220. When the reflective region is formed due to reflection of the human body, such as face and so on, of the target object, the reflective region is usually partially overlapped with the target object, and is accordingly located at or near the center of the acquired image data. Therefore, when the position of the reflective region is adjacent to the edge of the acquired image data, it can be preliminarily determined that the target object is not a living body. However, when the position of the reflective region is near or at the center of the acquired image data, it cannot be determined that the target object is a living body, because the display of the electronic apparatus used by the attacker probably also forms the reflective region at the center of the acquired image data.

Figure 5:
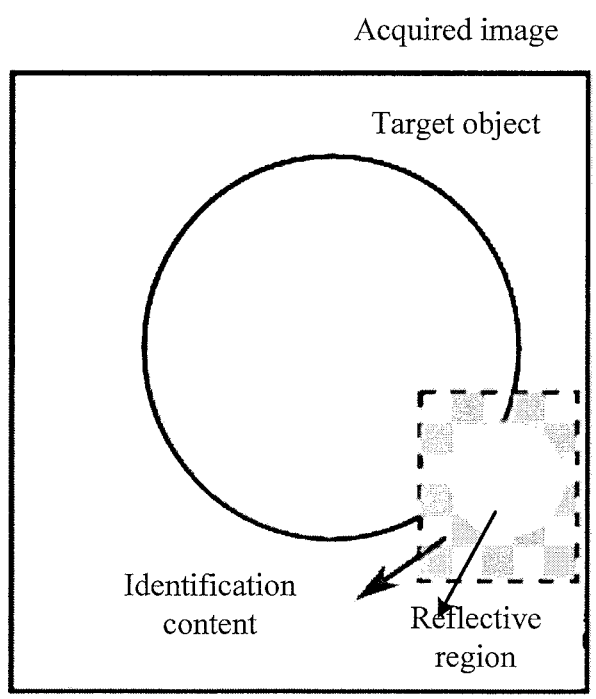
FIG. 5 schematically illustrates a reflective region determined by the liveness detection apparatus of FIG. 2.

FIG. 5 schematically illustrates a reflective region determined by the liveness detection apparatus of FIG. 2. As shown in FIG. 5, the target object is located at the center of the acquired image, the identification content is a black and white checkered pattern, and the reflective region corresponding to the black and white checkered pattern is adjacent to the edge of the acquired image, so that it can be determined that the target object is not a living body. In addition, the reflective region is very apparent in the acquired image, and is less than a position occupied by the black and white checkered pattern, so it can also be determined that the target object is not a living body according to the size of the reflective region.

In the technical solution of the liveness detection apparatus according to the embodiment of the present disclosure, by means of detecting the reflective region corresponding to the identification content in the acquired image data of the target object, and determining the regional feature of the reflective region, the specific target object which does not have a living human face can be recognized, thus, attacks of an attacker by means of an image, video display and other non-living tools can be prevented effectively.

Hereinafter, two examples illustrating the processor 230 performs a determination operation for the reflective region to obtain the determination result are further described.

Example One: in the case where the identification content exhibited by the specific exhibiting device 210 has a predetermined identification pattern, the processor 230, for example, may obtain the determination result by operations of: determining whether there is a region corresponding to the exhibited identification pattern in the acquired image data; and taking the region corresponding to the exhibited identification pattern as the reflective region, if there is the region corresponding to the exhibited identification pattern. Here, the identification pattern being the black and white checkered pattern shown in FIG. 3(b) is taken as an example. For each frame of the image data acquired by the image acquiring device 220, for example, an edge of the acquired image data is extracted by a Canny edge extraction operator, and positions of crossing points of all transverse edges and all longitudinal edges are recorded. If it is found that a certain number of cross points are connected by the edges to be a sufficiently large checkered shape, then it is deemed that the black and white checkered pattern shown in FIG. 3(b) appears, and a region surrounded by the outermost cross points is taken as the reflective region.

Example Two: the reference luminance sequence S[1 . . . n] is generated by the sequence generator 211 in FIG. 4, the display 212 applies reference luminance values S[1] to S[n] in the reference luminance sequence sequentially to the identification content at n different time points, respectively, so that luminance of the identification content changes with time; and the processor 230 may determine whether there is the reflective region in the acquired image data by operations of: calculating a correlation coefficient $c[x,y]$ between each pixel value $V[t,x,y]$ in the acquired image data and the reference luminance sequence S[1 . . . n]; determining whether positions where respective pixels are located are reflective positions based on the correlation coefficient c[x, y]; and determining whether there is the reflective region based on the calculated reflective positions. The V[t,x,y] represents a pixel value of the position (x,y) of the image acquired by the image acquiring device 220 at a time point t when the corresponding reference luminance value S[t] is applied, wherein 1≤t≤n.

The correlation coefficient may be calculated in a mode as follows: obtaining pixel values V[t,x,y] of each pixel in the acquired image data at the respective time points when the reference luminance values are applied; calculating a mean value Vm[x,y] and a variance Std(V) of the pixel values V[t,x,y] at the respective time points; calculating a mean value Sm and a variance Std(S) of the reference luminance sequence; calculating the correlation coefficient c[x,y] between the pixel values and the reference luminance sequence based on the mean value Vm[x,y] and the variance Std(V) of the pixel values and the mean value Sm and the variance Std(S) of the reference luminance sequence. Specifically, the mean value Vm[x,y] of the pixel values V[t,x,y] may be obtained by Equation (1) as follows:

$$Vm[x,y]=(V[1,x,y]+V[2,x,y]+ \ldots +V[n,x,y])/n \quad \text{Equation (1)}$$

where, the V[t,x,y] represents a pixel value of the position (x,y) of the acquired image at a time point t when the corresponding reference luminance value S[t] in the reference luminance sequence S[1 . . . n] is applied, wherein 1≤t≤n.

The variance Std(V) of the pixel values V[t,x,y] may be obtained by Equation (2) as follows:

$$Std(V) = \sqrt{\frac{(V[1,x,y]-Vm[x,y])^2 + (V[2,x,y]-Vm[x,y])^2 + \ldots + (V[n,x,y]-Vm[x,y])^2}{n}} \quad \text{Equation (2)}$$

where, Vm[x,y] is the mean value of the pixel (x,y) calculated by using Equation (1), the V[t,x,y] represents a pixel value of the position (x,y) of the acquired image at a time point t when the corresponding reference luminance value S[t] in the reference luminance sequence S[1 . . . n] is applied. The mean value Sm of the reference luminance sequence may be obtained by Equation (3) as follows:

$$Sm=(S[1]+S[2]+ \ldots +S[n])/n \quad \text{Equation(3)}$$

The variance Std(S) of the reference luminance sequence may be obtained by Equation (4) as follows:

$$Std(S) = \sqrt{\frac{((S[1]-Sm)^2 + (S[2]-Sm)^2 + \ldots + (S[n]-Sm)^2)}{n}} \quad \text{Equation (4)}$$

For each position (x,y), the correlation coefficient c[x,y] between the pixel values at the position (x,y) and the reference sequence may be obtained by Equation (5) as follows:

$$c[x,y]=((V[1,x,y]-Vm[x,y])*(S[1]-Sm)+(V[2,x,y]-Vm[x,y])*(S[2]-Sm)+ \ldots +(V[n,x,y]-Vm[x,y])*(S[n]-Sm))/Std(S)/Std(V) \quad \text{Equation (5)}$$

Accordingly, based on the correlation coefficient c[x,y], it may be determined whether the position where the respective pixels are located is the reflective position. For example, when the correlation coefficient c[x,y] is greater than or equal to a preset correlation threshold, it is determined that the pixel at a position (x,y) has reflection; and when the correlation coefficient c[x,y] is less than the preset correlation threshold, it is determined that the pixel at the position (x,y) does not have reflection. After the correlation coefficient is calculated for the pixel at each position in the image and it is determined whether the position is a reflective position, distribution of the reflective region in the image can be obtained. After that, its regional feature may be determined according to the distribution of the reflective region, to recognize whether the target object is a living body.

Figure 6:
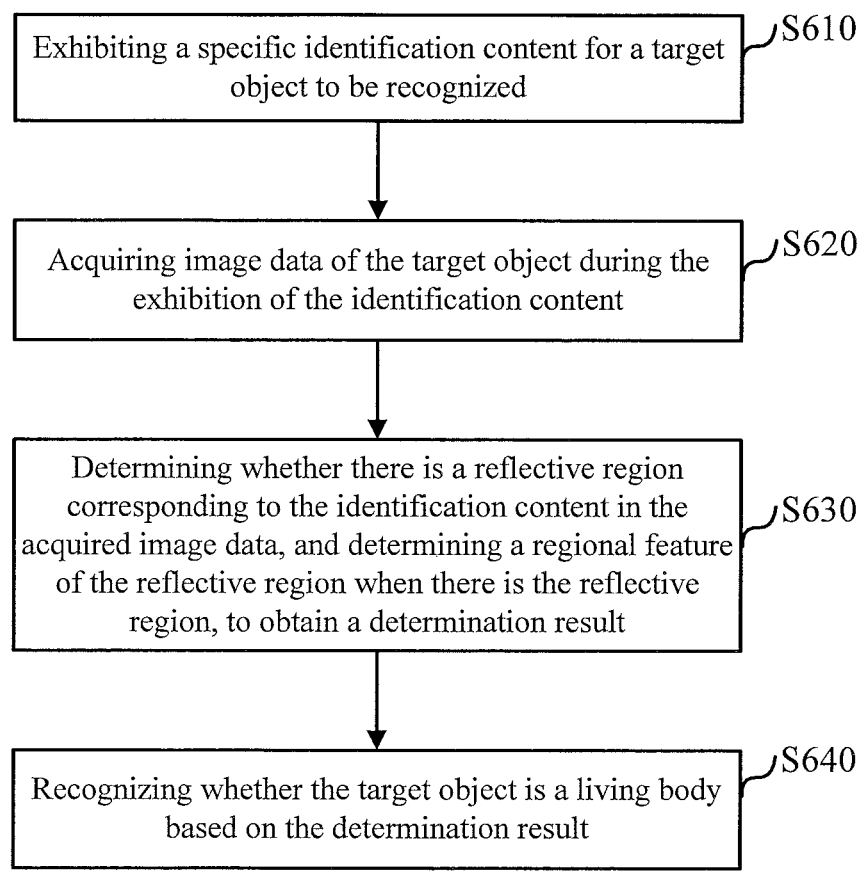
FIG. 6 schematically illustrates a flow chart of a liveness detection method according to an embodiment of the present disclosure.

FIG. 6 schematically illustrates a flow chart of a liveness detection method 600 according to an embodiment of the present disclosure. The liveness detection method 600 can by implemented by the liveness detection apparatus 10 shown in FIG. 1. As shown in FIG. 6, the liveness detection method 600 may comprise: exhibiting a specific identification content for a target object to be recognized (S610); acquiring image data of the target object during the exhibition of the identification content (S620); determining whether there is a reflective region corresponding to the identification content in the acquired image data, and determining a regional feature of the reflective region when there is the reflective region, to obtain a determination result (S630); and recognizing whether the target object is a living body based on the determination result (S640).

In S610, the identification content may be exhibited by using a display, an image exhibition bar, and so on. The identification content is used for helping discriminate whether reflection is produced through the target object to be recognized. When the target object is a video exhibited by an electronic apparatus used by an attacker shown in FIG. 1, any scene facing a screen of the electronic apparatus may produce reflection on the screen of the electronic apparatus, so that a picture of the scene appears on the screen of the electronic apparatus. The identification content faces the target object to be recognized, and reflection through the electronic apparatus used by the attacker is most likely to appear, so as to form the reflective region corresponding to the identification content. The identification content may be any image content, for example, a picture content of a single color, a picture content of an object, such as a big tree, a desk, and so on. Any content that can be distinguished from the environment around the liveness detection apparatus can be taken as the identification content.

The identification content is a content easily seen by the target object. When the attacker attacks by means of the electronic apparatus, the attacker may easily find existence of the identification content, and thus takes a countermeasure. Thus, the identification content may be exhibited in a hidden way. For example, at least one of a title bar, a tool bar and a background region of the liveness detection apparatus that the liveness detection method is applied may be exhibited as the identification content. The title bar, the tool bar or the background region and other application of the liveness detection apparatus are inherent exhibition contents of the liveness detection apparatus, which thus can hardly be considered as the identification content specifically set for liveness detection. Illustration and related description of FIG. 3(a) and FIG. 3(b) may be referred as the examples of the identification content.

During a process of exhibiting the identification content, a display effect thereof may be further adjusted, so as to recognize the identification content from the acquired image data of the target object more conveniently. For example, in S610, a reference sequence may be randomly generated; and the reference sequence is applied to the identification content, to adjust the display effect of the identification content. The reference sequence generated thereby includes, for example, a reference luminance sequence S[1 . . . n], which includes reference luminance values different from each other, where n is a natural number greater than 1. The reference sequence is randomly generated, which cannot be imitated in advance, so that attacks can be prevented. S[1] to S[n] may be applied to the identification content at different time points, respectively, so that luminance of the identification content changes with time accordingly. The reference sequence may also be a color parameter sequence, so that accordingly, color of the identification content changes with time. In order to avoid the attacker's attention, an application pattern having an animation effect may be used as the identification content, to adjust a display effect of the application pattern.

In S620, the image data of the target object to be recognized is acquired during the exhibition of the identification content. In the case where the liveness detection method 600 is used in a hand-held terminal, in S620, the image data of the target object may be acquired by a front camera of the hand-held terminal. The front camera may be a visible-light-based color or gay-scale camera. An acquisition operation is performed during the exhibition of the identification content, to ensure that the identification content reflects light on the electronic apparatus of the attacker, so as to determine the corresponding reflective region.

In S630, it is determined whether there is the reflective region corresponding to the identification content in the acquired image data, and the regional feature of the reflective region is determined when there is the reflective region, to obtain a determination result. The reflective region is a projection of the identification content on a display screen used by the attacker. The identification content in the acquired image data may be detected to determine the reflective region. As an example, the identification data corresponding to the identification content may be obtained, and a similarity detection is performed on the identification data and the acquired image data, to determine whether there is the reflective region corresponding to the identification content in the acquired image data. The reflective region may be determined with existing techniques or means or a variety of techniques or means that may appear in the future, and a specific mode for determining the reflective region does not constitute a limitation to the embodiment of the present disclosure.

When there is no reflective region corresponding to the identification content in the acquired image data, it may be determined that the target object is not a video or an image displayed on the electronic apparatus by the attacker, so as to determine that the target object to be verified is a living body. When there is the reflective region corresponding to the identification content in the acquired image data, in S630, the regional feature of the reflective region is further determined. For example, at least one of a size and a position of the reflective region may be calculated as the regional feature of the reflective region, and it is recognized whether the target object is a living body based on at least one of the size and the position of the reflective region.

Figure 7:
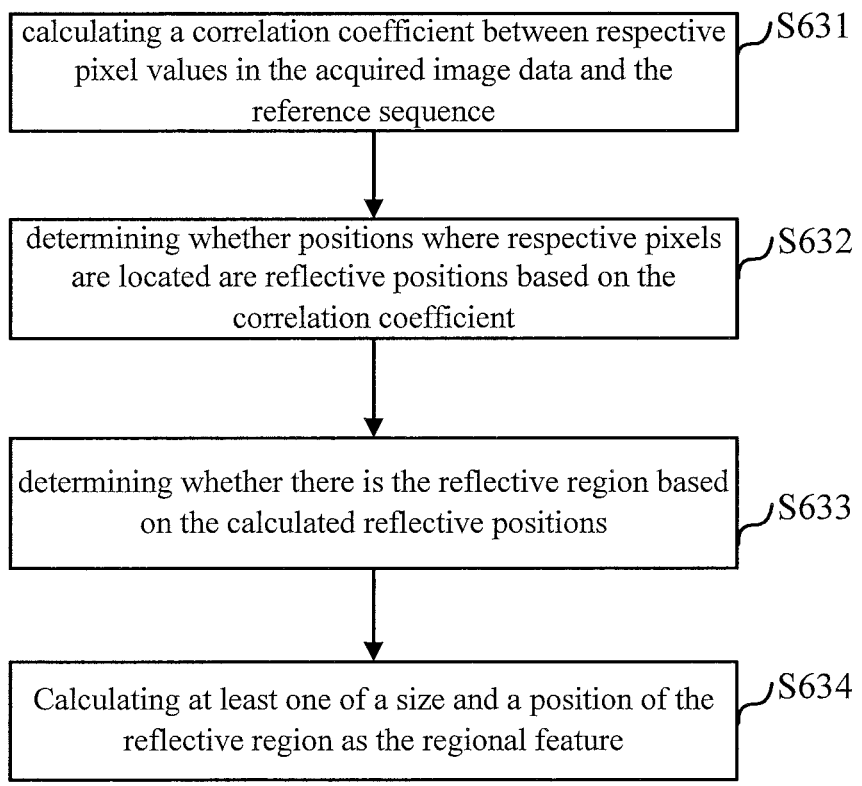
FIG. 7 schematically illustrates a flow chart of a determination operation for the reflective region in the liveness detection method of FIG. 6.

FIG. 7 schematically illustrates a flow chart of a determination operation for the reflective region in the liveness detection method of FIG. 6. As shown in FIG. 7, the determination operation of the reflective region (S630) may include: calculating a correlation coefficient between respective pixel values in the acquired image data and the reference sequence (S631); determining whether positions where the respective pixels are located are reflective positions based on the correlation coefficient (S632); determining whether there is the reflective region based on the calculated reflective positions (S633); and calculating at least one of the size and the position of the reflective region as the regional feature (S634).

In S610, in a case where the reference luminance sequence is randomly generated and the plurality of reference luminance values are sequentially applied to the identification content at different time points to adjust the display effect, in S631, the correlation coefficient may be calculated in such a way as: obtaining pixel values of each pixel in the image data at the respective time points at which the reference luminance values are applied; calculating a mean value and a variance of the pixel values at the respective time points; calculating a mean value and a variance of the reference luminance sequence; calculating the correlation coefficient between the pixel values and the reference sequence based on the mean value and the variance of the pixel values and the mean value and the variance of the reference luminance sequence. Description in combination with Equation (1) to Equation (5) may be referred as the specific implementation example.

In S632, it is determined whether positions where the respective pixels are located are reflective positions based on the correlation coefficient. For example, when the correlation coefficient is greater than or equal to a preset correlation threshold, the pixel at a position corresponding to the correlation coefficient has reflection; and when the correlation coefficient is less than the preset correlation threshold, the pixel at the position corresponding to the correlation coefficient does not have reflection.

After the correlation coefficient is calculated for the pixel at each position in the image, and it is determined whether it is the reflective position, in S633, it may be determined whether there is the reflective region, and distribution of the reflective region in the image is obtained.

In S634, its regional feature may be determined according to the distribution of the reflective region. The regional feature includes, for example, at least one of the size and the position of the reflective region. The reflective region of the identification content produced in the acquired image through a living body such as a human face, is usually small, and relatively dispersed. When the attacker attacks by using a display of the electronic apparatus, the size and the position of the reflective region of the identification content produced on the display of the electronic apparatus usually depend on the size of the identification content, and a distance and an included angle between the identification content and the target object, and for the size and the position of the reflective region, a typical size range and a typical position range can be obtained through an experiment. Thus, by means of the regional feature, such as the size and the position of the reflective region, it can be recognized whether the target object is a living body. If it is recognized whether the target object is a living body by means of both the size and the position of the reflective region, accuracy of recognition may be improved.

Alternatively, in a case where the identification content has a predetermined identification pattern, in S630, it may be determined whether there is a reflective region corresponding to the identification content in the acquired image data as follows: determining whether there is a region corresponding to the exhibited identification pattern in the acquired image data; and taking the region corresponding to the exhibited identification pattern as the reflective region, if there is the region corresponding to the exhibited identification pattern. Here, the identification pattern being the black and white checkered pattern shown in FIG. 3(b) is taken as an example. For each frame of the acquired image data, for example, an edge of the acquired image data is extracted by a Canny edge extraction operator, and positions of crossing points of all transverse edges and all longitudinal edges are recorded. If it is found that a certain number of cross points are connected by the edges to be a sufficiently large checkered shape, then it is deemed that the black and white checkered pattern shown in FIG. 3(b) appears, and a region surrounded by the outermost cross points is taken as the reflective region. If the cross points are not connected by the edges to become a sufficiently large checkered shape, then it is deemed that the black and white checkered pattern shown in FIG. 3(b) does not appear, and then there is no reflective region in the acquired image data. Illustration of FIG. 5 may be referred as the reflective region determined in this case.

When it is determined there is no reflective region in S630, it may be determined in S640 that the target object is not a video or an image displayed on the electronic apparatus by the attacker, so as to determine that the target object to be verified is a living body.

In a case where the regional feature of the reflective region includes the size of the reflective region, in S640, it may be recognized whether the target object is a living body based the size of the reflective region. Specifically, the size of the reflective region is compared with a first threshold and a second threshold, wherein the second threshold is greater than the first threshold, and the target object is recognized not as a living body when the size of the reflective region is greater than or equal to the first threshold and less than the second threshold, or otherwise, the target object is recognized as a living body. The first threshold and the second threshold are set based on the above-described typical size range obtained through an experiment. A reflective property of a human body is far worse than a reflective property the display of the electronic apparatus. When the size of the reflective region is less than the first threshold, the reflective region may be caused by reflection of the human body, and it can be determined that the target object is a living body. Depending on the size of the identification content and its positional relationship with respect to the target object, the size of the reflective region corresponding to the identification content is not likely to be too large. Accordingly, when the size of the reflective region is greater than or equal to the second threshold, the reflective region should not correspond to the identification content, and it can be determined that the target object is a living body.

The target object may wear glasses and so on. At this situation, the glasses may form a strong reflective property for the identification content, so that the size of the reflective region is greater than or equal to the first threshold and less than the second threshold. Accordingly, if the target object is recognized not as a living body, it may be a false determination. Thus, in S640, other means can be combined to recognize whether the target object is a living body. For example, the target object can be recognized as a living body or not based on the position of the reflective region.

In the case where the regional feature of the reflective region includes the position of the reflective region, it may be recognized whether the target object is a living based the position of the reflective region in S640. Specifically, the position of the reflective region in the acquired image data can be determined, when the position of the reflective region is adjacent to the edge of the acquired image data, the target object is recognized not as a living body. The target object to be recognized is usually located at a center of the acquired image. When the reflective region is formed due to reflection of the human body, such as face and so on, of the target object, the reflective region is usually partially overlapped with the target object, and is accordingly located near or at the center of the acquired image data. Therefore, when the position of the reflective region is adjacent to the edge of the acquired image data, it can be preliminarily determined that the target object is not a living body. However, when the position of the reflective region is near the center of the acquired image data, it cannot be determined that the target object is a living body, because the display of the electronic apparatus used by the attacker can also form the reflective region at the center of the acquired image data.

In the technical solution of the liveness detection method according to the embodiments of the present disclosure, by means of detecting the reflective region corresponding to the identification content in the acquired image data of the target object, and determining the regional feature of the reflective region, the specific target object which does not have a living human face can be recognized, so as to effectively prevent attacks from an attacker by means of an image, video display and other non-living tools.

Figure 8:
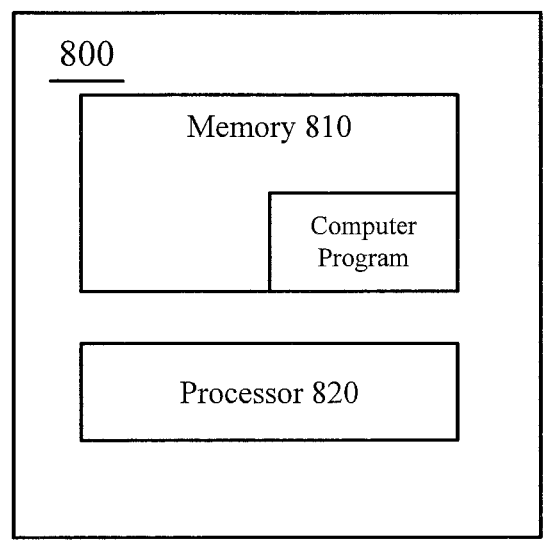
FIG. 8 schematically illustrates a block diagram of an electronic apparatus used for liveness detection according to an embodiment of the present disclosure.

FIG. 8 schematically illustrates a block diagram of an electronic apparatus 800 used for liveness detection according to an embodiment of the present disclosure. As shown in FIG. 8, the electronic apparatus 800 used for liveness detection may comprise a memory 810 and a processor 820. The memory 810 has a computer program stored thereon. The processor 820 executes the computer program to implement the liveness detection method described in combination with FIG. 6 to FIG. 7.

The memory 810 may include at least one of a Read-Only Memory (ROM) and a Random Access Memory (RAM), and provide instruction and data for the processor 820. The number of memories 810 may be one or more, which, for example, may be a volatile memory and/or a nonvolatile memory. The volatile memory may, for example, comprise a RAM and/or a cache and the like. The nonvolatile memory may, for example, comprise a ROM, a hard disk, a flash disk and the like. The memory 810 may also store acquired image information, audio information and the like.

The processor 820 may be a general-purpose processor, a Digital Signal Processor (DSP), an Application-Specific Integrated Circuit (ASIC), a Field-Programmable Gate Array (FPGA) or other programmable logic devices, discrete gates or transistor logic devices, and discrete hardware components. The general-purpose processor may be a microprocessor or any conventional processor, and so on.

Although not shown, the apparatus 800 for verifying a living human face may further comprise an input device, an output device, a communication device and an image acquiring device, and these components are interconnected through a bus system and/or a connecting mechanism in any other form. The input device may be a device for inputting an instruction by a user, and may comprise one or more components selected from a keyboard, a mouse, a microphone, a touch panel and the like. The instruction is, for example, an instruction of capturing an image by a camera as described below. The output device may output various kinds of information including a generated alphabetic string presented to the object to be verified to one or more exterior component, for example, components selected from a display, a loudspeaker and the like, and/or the user. The communication device may communicate with other devices (for example, a personal computer, a server, a mobile station, a base station, and so on) through a network or other technologies, wherein the network may be Internet, a wireless local area network, a mobile communication network and the like, and the other technologies may, for example, comprise Bluetooth communication, infrared communication and the like. The image acquiring device may acquire an image (e.g., a photograph, a video, and so on) desired by the user, and store the acquired image thereby in the memory 810 for use by other components. The input device, the output device, the communication device and the image acquiring device may be selected and combined appropriately when necessary.

In addition to the apparatus, the method and the electronic apparatus as described above, the embodiments of the present disclosure may also be a computer program product, for performing liveness detection. The computer program product comprises a computer-readable storage medium, with computer program instructions stored thereon, and the computer program instructions may be executed by the processor to enable the processor to: exhibit a specific identification content for a target object to be recognized; acquire image data of the target object to be recognized during the exhibition of the identification content; determine whether there is a reflective region corresponding to the identification content in the acquired image data, determine a regional feature of the reflective region when there is the reflective region, to obtain a determination result; and recognize whether the target object is a living body based on the determination result. The above description in combination with FIGS. 6-7 may be referred to the detailed and specific description of the liveness detection method performed by the computer program product.

Those ordinarily skilled in the art may be aware that, the units and algorithm steps in various examples described in conjunction with the embodiments of the present disclosure, may be implemented by electronic hardware, or a combination of computer software and electronic hardware. It depends on specific applications and design constraints of the technical solutions whether these functions are executed by hardware or software. A person skilled in the art can implement the described function by using different methods for each specific application, but such implementation should not be considered as going beyond the scope of this disclosure.

In the several embodiments provided by the present disclosure, it shall be appreciated that the disclosed apparatus and method can be implemented in other technical means. For example, the aforesaid apparatus embodiments are given by way of illustration only, e.g., the division of the units is only a logic functional division, and may be conducted in other dividing manners in practical implementation. For example, a plurality of units or components can be combined or integrated into another device, or some of the features may be ignored or not performed.

The foregoing embodiments are only specific embodiments of the present disclosure, but the protection scope of the present disclosure is not limited thereto. In the technical scope disclosed by the present disclosure, changes or substitutions easily thought by any skilled in the art are all covered in the protection scope of the present disclosure. Therefore, the protection scope of the present disclosure should be defined as the following claims.

The invention claimed is:

1. A liveness detection apparatus, comprising:
 a specific exhibiting device configured to exhibit a specific identification content;
 an image acquiring device configured to acquire image data of a target object to be recognized during the exhibition of the identification content;
 a processor configured to determine whether there is a reflective region corresponding to the identification content in the acquired image data, to determine a regional feature of the reflective region when there is the reflective region, to obtain a determination result, and to recognize whether the target object is a living body based on the determination result,
 wherein the specific exhibiting device includes:
  a sequence generator configured to randomly generate a reference sequence; and
  a display configured to apply the reference sequence to the identification content, and to adjust a display effect of the identification content,
 wherein the processor determines whether there is a reflective region in the acquired image data by operations of:
  calculating a correlation coefficient between respective pixel values in the acquired image data and the reference sequence,
  determining whether positions where the respective pixels are located are reflective positions based on the correlation coefficient, and
  determining whether there is the reflective region based on the calculated reflective positions.

2. The liveness detection apparatus according to claim 1, wherein the specific exhibiting device is configured to exhibit at least one of a title bar, a tool bar, and a background region of the liveness detection apparatus as the identification content.

3. The liveness detection apparatus according to claim 1, wherein the display is configured to apply the reference sequence to an application pattern having an animation effect, and to adjust the display effect of the application pattern.

4. The liveness detection apparatus according to claim 1, wherein, the reference sequence comprises a reference luminance sequence including a plurality of reference luminance values different from each other, the display applies the plurality of reference luminance values sequentially to the identification content at different time points, and the processor calculates the correlation coefficient by operations of:
 obtaining pixel values in the acquired image data at the respective time points when the reference luminance values are applied;
 calculating a mean value and a variance of the pixel values at the respective time points;
 calculating a mean value and a variance of the reference luminance sequence;
 calculating the correlation coefficient between the pixel values and the reference sequence based on the mean value and the variance of the pixel values and the mean value and the variance of the reference luminance sequence.

5. The liveness detection apparatus according to claim 1, wherein, the identification content comprises a predetermined identification pattern, and the processor obtains the determination result by operations of:
 determining whether there is a region corresponding to the exhibited identification pattern in the acquired image data;

taking the region corresponding to the exhibited identification pattern as the reflective region if there is the region corresponding to the exhibited identification pattern.

6. The liveness detection apparatus according to claim 1, wherein, the processor calculates at least one of a size and a position of the reflective region as the regional feature of the reflective region, and recognizes whether the target object is a living body based on at least one of the size and the position of the reflective region.

7. The liveness detection apparatus according to claim 6, wherein,
in the case of recognizing whether the target object is a living body based on the size of the reflective region, the processor compares the size of the reflective region with a first threshold and a second threshold, wherein the second threshold is greater than the first threshold, and recognizes the target object not as a living body when the size of the reflective region is greater than or equal to the first threshold and less than the second threshold, or otherwise, recognizes the target object as a living body;
in the case of recognizing whether the target object is a living body based on the position of the reflective region, the processor determines the position of the reflective region in the acquired image data, and recognizes the target object not as a living body when the position of the reflective region is adjacent to an edge of the acquired image data.

8. The liveness detection apparatus according to claim 1, wherein, the liveness detection apparatus is provided in a hand-held terminal, and the image acquiring device is a front camera of the hand-held terminal.

9. A liveness detection method, comprising:
exhibiting a specific identification content for a target object to be recognized;
acquiring image data of the target object during the exhibition of the identification content;
determining whether there is a reflective region corresponding to the identification content in the acquired image data, and determining a regional feature of the reflective region when there is the reflective region, to obtain a determination result; and
recognizing whether the target object is a living body based on the determination result,
wherein the step of exhibiting a specific identification content for a target object to be recognized includes:
randomly generating a reference sequence; and
applying the reference sequence to the identification content, to adjust a display effect of the identification content;
wherein the step of determining whether there is a reflective region corresponding to the identification content in the acquired image data includes:
calculating a correlation coefficient between respective pixel values in the acquired image data and the reference sequence;
determining whether positions where respective pixels are located are reflective positions based on the correlation coefficient; and
determining whether there is the reflective region based on the calculated reflective positions.

10. The liveness detection method according to claim 9, wherein, the liveness detection method is applied to a liveness detection apparatus, and the step of exhibiting a specific identification content for a target object to be recognized includes:
exhibiting at least one of a title bar, a tool bar and a background region of the liveness detection apparatus as the identification content.

11. The liveness detection method according to claim 9, wherein, the step of applying the reference sequence to the identification content, to adjust a display effect of the identification content includes: applying the reference sequence to an application pattern having an animation effect, to adjust a display effect of the application pattern.

12. The liveness detection method according to claim 9, wherein,
the reference sequence comprises a reference luminance sequence including a plurality of reference luminance values different from each other,
the step of applying the reference sequence to the identification content to adjust a display effect of the identification content includes: applying the plurality of reference luminance values sequentially to the identification content at different time points, to adjust the display effect of the identification content;
the step of calculating a correlation coefficient between respective pixel values in the acquired image data and the reference sequence includes:
obtaining pixel values in the acquired image data at the respective time points when the reference luminance values are applied;
calculating a mean value and a variance of the pixel values at the respective time points;
calculating a mean value and a variance of the reference luminance sequence;
calculating the correlation coefficient between the pixel values and the reference sequence based on the mean value and the variance of the pixel values and the mean value and the variance of the reference luminance sequence.

13. The liveness detection method according to claim 9, wherein, the identification content comprises a predetermined identification pattern, and the step of determining whether there is a reflective region corresponding to the identification content in the acquired image data includes:
determining whether there is a region corresponding to the exhibited identification pattern in the acquired image data;
taking the region corresponding to the exhibited identification pattern as the reflective region, if there is the region corresponding to the exhibited identification pattern.

14. The liveness detection method according to claim 9, wherein,
the step of determining a regional feature of the reflective region includes: calculating at least one of a size and a position of the reflective region as the regional feature; and
the step of recognizing whether the target object is a living body based on the determination result includes: recognizing whether the target object is a living body based on at least one of the size and the position of the reflective region.

15. The liveness detection method according to claim 14, wherein, the step of recognizing whether the target object is a living body based on at least one of the size and the position of the reflective region includes:
in the case of recognizing whether the target object is a living body based on the size of the reflective region, comparing the size of the reflective region with a first threshold and a second threshold, wherein the second threshold is greater than the first threshold; and recognizing the target object not as a living body when the size of the reflective region is greater than or equal to the first threshold and less than the second threshold, otherwise, recognizing the target object as a living body;

in the case of recognizing whether the target object is a living body based on the position of the reflective region, determining a position of the reflective region with respect to an edge of the acquired image data;

recognizing the target object not as a living body when the reflective region is adjacent to the edge of the acquired image data.

16. The liveness detection method according to claim 9, wherein, the liveness detection method is applied to a hand-held terminal, and the step of acquiring image data of the target object includes: acquiring the image data of the target object with a front camera of the hand-held terminal.

* * * * *